H. L. SHERMAN.
TRACTOR.
APPLICATION FILED SEPT. 8, 1917.

1,357,528.

Patented Nov. 2, 1920.

Inventor
Harry L Sherman
by A. B. Bowman
Attorney

UNITED STATES PATENT OFFICE.

HARRY L. SHERMAN, OF SAN DIEGO, CALIFORNIA, ASSIGNOR OF ONE-THIRD TO A. D. MULVEY AND ONE-THIRD TO WILLIAM I. IRWIN, BOTH OF SAN DIEGO, CALIFORNIA.

TRACTOR.

1,357,528.  Specification of Letters Patent.  Patented Nov. 2, 1920.

Application filed September 8, 1917. Serial No. 190,307.

*To all whom it may concern:*

Be it known that I, HARRY L. SHERMAN, a citizen of the United States, residing at San Diego, in the county of San Diego and State of California, have invented certain new and useful Improvements in Tractors, of which the following is a specification.

My invention relates to tractors, more particularly the control mechanism for tractors, and the objects of my invention are: first, to provide a tractor which is easy to control and operate; second, to provide a tractor of this class which may be turned in a minimum of space; third, to provide a tractor of this class in which the wheels on one side may be readily revolved in one direction while the wheels on the opposite side revolve in the opposite direction; and fourth, to provide a tractor of this class which is very simple and economical of construction, durable, easy to operate and will not readily deteriorate or get out of order.

Figure 1:
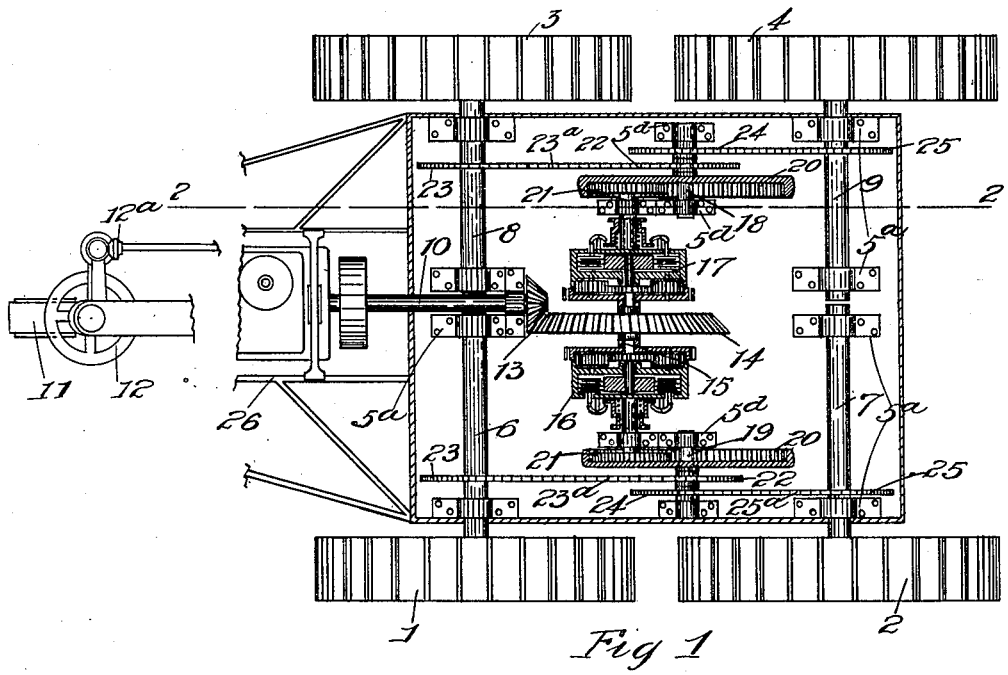
Figure 2:
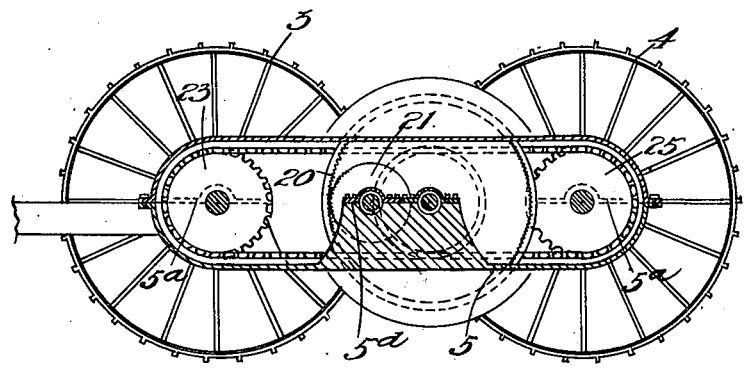

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a top or plan view of my tractor with the upper portion of the casing removed, less a fragmentary portion, which fragmentary portion is of a conventional structure and showing portions broken away and in section to facilitate the illustration; and Fig. 2 is a sectional view through 2—2 of Fig. 1.

Similar characters of reference refer to similar parts throughout the different views of the drawings.

The wheels 1, 2, 3 and 4, casing 5, axles 6, 7, 8 and 9, main shaft 10, rear wheel 11, rear wheel control 12, bevel pinion 13, bevel gear 14, shaft 15, planetary transmissions 16 and 17, shafts 18, and 19, internal gears 20, spur gears 21, sprockets 22, sprockets 23, sprockets 24, and sprockets 25 constitute the principal parts of my tractor.

The wheels 1, 2, 3 and 4 are preferably metallic wheels with broad faces and provided with lugs on their outer surfaces adapted to provide traction for said wheels. These wheels are secured on the outwardly extending ends of the axles 6, 7, 8 and 9 and the inwardly extending ends of said axles are journaled in the bearings 5ª which are secured to the lower portion of the casing 5 and said axles extend to near the middle of the tractor. The engine which is an ordinary or conventional gas engine is mounted on a frame 26 and the main shaft 10 of said engine extends backwardly into the casing and on the inwardly extending end is a bevel pinion 13 which engages a bevel gear 14 secured on the shaft 15 which is at right angles to the shaft 10. This shaft 15 is a three piece shaft and mounted thereon are the planetary transmission mechanisms 16 and 17 each of which provides forward and backward movement. Mounted on the outwardly extending ends of this shaft 15 are the spur gears 21 which engage with the internal gears 20 which are mounted on shafts 18 and 19 parallel to the shaft 15 and journaled in bearings 5ᵈ which are secured to the lower portion of the casing 5. Mounted on these shafts 18 and 19 adjacent the gears 20 are sprockets 22 and in alinement therewith on the shafts 6 and 8 are sprockets 23 and they are connected by means of chains 23ª, also mounted on these shafts 18 and 19 adjacent the sprockets 22 are sprockets 24 and in alinement therewith on the axles 7 and 9 are the sprockets 25 and connecting the sprockets 24 and 25 are chains 25ª. The rear wheel 11 is mounted on a vertical axle and is controlled by the rear wheel control 12 through the gears 12ª.

The operation of the tractor is as follows:

The engine revolves the shaft 10 which revolves the shaft 15 through the pinion 13 and gear 14. The planetary transmission mechanisms 16 and 17 provide means for revolving the outwardly extending ends of the shaft 15 either in the same direction or in the opposite directions which in turn revolve the axles 6, 7, 8 and 9 in the same direction or in the reverse direction, or the axles 6 and 7 may be revolved in one direction and the axles 8 and 9 in the opposite direction so that the wheels 3 and 4 may be revolved backward while the wheels 1 and 2 are revolved forwardly which causes the tractor to turn in a very short space.

Though I have shown and described a particular construction, combination and arrangement of parts, I do not wish to be limited to this particular construction, combination and arrangement but desire to include in the purview of my invention the construction, combination and arrangement substantially as set forth in the appended claims.

Having thus described my invention what I claim as new and desire to secure by Letters Patent, is:

1. In a tractor, an inclosing casing, a pair of axles revolubly mounted in each side thereof, wheels secured on the extended ends of said axles, a main drive shaft, a transmission shaft connected thereto by means of bevel gears, a planetary transmission mechanism of both forward and reverse movement mounted on said shaft on opposite sides of the bevel gear on said shaft, auxiliary shafts parallel with said main transmission shaft, internal gears secured to said auxiliary shafts, external gears mounted on the extended ends of said main transmission shaft engaging said internal gears and means coöperatively connecting said auxiliary shafts with the pair of axles in the same side of said casing whereby the pair of shafts in one side of said casing may be turned in the same direction as the pair of shafts in the other side of said casing or the pair of shafts in one side may be turned in the opposite direction to those in the other side as desired.

2. In a tractor, the combination of a power mechanism, a main drive shaft secured thereto, a bevel pinion secured on the end of said main drive shaft, a bevel gear engaging therewith, a transmission shaft on which said bevel gear is secured, a planetary transmission mechanism of both forward and reverse movement arranged on opposite sides of said bevel gear on said shafts, means coöperatively connecting the opposite ends of said transmission shaft with separate axles on opposite sides of said tractor comprising auxiliary shafts parallel with said transmission shaft, internal gears secured to said auxiliary shaft, gears on said transmission shaft engaging therewith and chain and sprocket means connecting said auxiliary shafts with a pair of axles on their respective sides and a traction wheel mounted on each axle whereby a pair of traction wheels on each side of said tractor may be turned in the same direction as the wheels on the opposite side or may be turned in unison as desired and a casing inclosing said mechanism in which all of said shafts are journaled.

In testimony whereof I have hereunto set my hand at San Diego, California, this 31st day of August, 1917.

HARRY L. SHERMAN.